(12) United States Patent
Valko et al.

(10) Patent No.: US 8,323,470 B2
(45) Date of Patent: Dec. 4, 2012

(54) ELECTRODEPOSITION COATINGS FOR USE OVER ALUMINUM SUBSTRATES

(75) Inventors: Joseph T. Valko, Pittsburgh, PA (US);
Robin M. Peffer, Valencia, PA (US);
Craig A. Wilson, Allison Park, PA (US);
Alan J. Kaylo, Glenshaw, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1368 days.

(21) Appl. No.: 11/839,127

(22) Filed: Aug. 15, 2007

(65) Prior Publication Data

US 2009/0045071 A1 Feb. 19, 2009

(51) Int. Cl.
*C25D 13/06* (2006.01)
*C08L 63/00* (2006.01)

(52) U.S. Cl. ........................................ 204/492; 523/415
(58) Field of Classification Search .................. 204/492; 523/415
See application file for complete search history.

(56) References Cited

U.S. PATENT DOCUMENTS

| | | | |
|---|---|---|---|
| 4,434,256 A * | 2/1984 | Dworak et al. | 523/402 |
| 4,829,105 A * | 5/1989 | Yamada et al. | 523/415 |
| 5,250,325 A | 10/1993 | Phillips et al. | |
| 5,277,709 A | 1/1994 | Armstrong et al. | |
| 5,344,858 A * | 9/1994 | Hart et al. | 523/411 |
| 5,756,638 A | 5/1998 | Von Gentzkow et al. | 528/108 |
| 6,248,225 B1 * | 6/2001 | Palaika et al. | 204/484 |
| 6,271,377 B1 * | 8/2001 | Galbo et al. | 546/14 |
| 6,312,812 B1 | 11/2001 | Hauser et al. | 428/412 |
| 6,479,151 B2 | 11/2002 | Buter et al. | 428/413 |
| 7,494,716 B2 * | 2/2009 | Ehmann et al. | 428/418 |
| 2003/0004231 A1 | 1/2003 | Ehmann et al. | |
| 2004/0050704 A1 | 3/2004 | Rakiewicz et al. | |
| 2004/0079647 A1 | 4/2004 | Warburton et al. | 205/170 |
| 2004/0249043 A1 | 12/2004 | Stoffer et al. | |
| 2005/0215670 A1 | 9/2005 | Shimasaki et al. | |
| 2007/0048550 A1 | 3/2007 | Millero et al. | |
| 2008/0090069 A1 | 4/2008 | Walters et al. | |

FOREIGN PATENT DOCUMENTS

| | | |
|---|---|---|
| EP | 0 174 628 B1 | 12/1991 |
| EP | 0 469 491 B1 | 1/1995 |
| EP | 1 319 033 B1 | 4/2007 |
| RU | 2129570 C1 | 4/1999 |
| RU | 2282648 C21 | 8/2006 |
| WO | WO 91/19837 | 12/1991 |
| WO | WO 00/32351 | 6/2000 |
| WO | WO 01/46495 A2 | 6/2001 |
| WO | 2004003086 | 1/2004 |

* cited by examiner

*Primary Examiner* — Kishor Mayekar
(74) *Attorney, Agent, or Firm* — William J. Uhl; Donald R. Palladino

(57) ABSTRACT

A process for applying a coating on aluminum substrates by anionic electrodeposition of a phosphated epoxy resin made by phosphating a polyepoxide with both phosphoric acid and an organophosphonic acid and/or an organophosphinic acid. The coating has a reduced tendency to form pinholes.

21 Claims, No Drawings

ELECTRODEPOSITION COATINGS FOR USE OVER ALUMINUM SUBSTRATES

FIELD OF THE INVENTION

The present invention relates to the use of electrodeposition to provide coatings on aluminum substrates in which the coating has an improved appearance.

BACKGROUND OF THE INVENTION

Aluminum is the metal most prominently used in aircraft assembly. Structural joints of aircraft are adhesively bound together. However, many adhesives do not adhere well to the aluminum substrate. To improve the adhesive strength in the joint areas, it is known to apply an electrodeposition coating to the aluminum substrate. A preferred coating in this regard is derived from a phosphated epoxy resin that is prepared by reacting an epoxy resin such as polyglycidyl ether of a polyphenol with phosphoric acid. The coating is applied by anionic electrodeposition and adheres very well to aluminum substrates and to subsequently applied adhesives. One problem with the electrodeposition coating is the formation of pinholes in the coating which give a rough coating with poor appearance. Also, the pinholes can be a point of failure in the coating.

SUMMARY OF THE INVENTION

The present invention overcomes the above problems by using a phosphated epoxy resin that is obtained by reacting one or more epoxy resins with phosphoric acid and with an organophosphonic acid and/or an organophosphinic acid. More specifically, the invention provides a process for providing a coating on aluminum substrates by passing an electric current between the substrate acting as an anode and a cathode in electrical contact with an electrodeposition bath containing an aqueous dispersion of a base-neutralized resinous composition containing an ungelled phosphated epoxy resin in which the phosphated epoxy resin comprises a mixture of the reaction product of one or more polymeric epoxy compounds with phosphoric acid and with an organophosphonic acid and/or an organophosphinic acid.

DETAILED DESCRIPTION

The phosphated epoxy resins useful herein are ungelled and typically are prepared as follows. An epoxy-containing material, such as a polyepoxide is reacted with a phosphorus acid such as a phosphoric acid or an equivalent thereof. The polyepoxide useful herein can be a compound or a mixture of compounds having more than 1.0 epoxy groups per molecule. Several polyepoxides are known in the art. Examples of the polyepoxides can be found in the Handbook of Epoxy Resins, Lee and Neville, 1967, McGraw-Hill Book Company.

A preferred class of polyepoxides are the polyglycidyl ethers of polyphenols, such as bisphenol A. These are produced by etherification of a polyphenol with an epichlorohydrin in the presence of an alkali. The phenolic compound can be 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl) propane; bis(2-hydroxynaphthyl)methane; 1,5-dihydroxynaphthalene; and 1,1-bis(4-hydroxy-3-allylphenyl)ethane. Another useful class of polyepoxides are produced similarly from polyphenol resins.

In addition to the polyepoxides described above, there can also be employed addition polymerization polymers containing pendant epoxy groups. These polymers are made by copolymerizing a variety of polymerizable ethylenically unsaturated monomers at least one of which is an epoxy containing monomer, e.g., glycidyl acrylate or glycidyl methacrylate.

A suitable ethylenically unsaturated monomer that does not contain a group that is reactive with the epoxy group can be employed herein as a comonomer. The preferred monomers include alpha, beta-ethylenically unsaturated monomers, e.g., unsaturated carboxylic acid esters of saturated alcohols containing from 1 to about 8 carbon atoms, and monovinyl aromatic monomers such as styrene and vinyl toluene.

The preferred polyepoxides have epoxy equivalent weight of about 172 to 5000 and preferably 300 to 1000.

In addition to the polyepoxides, the reaction mixture can contain a monomeric monoepoxide such as monoglycidyl ethers of alcohols and phenols, such as phenyl glycidyl ether, and glycidyl esters of monocarboxylic acids such as glycidyl neodecanoate.

The phosphoric acid that is reacted with the epoxy-containing material can be a 100 percent orthophosphoric acid or a phosphoric acid aqueous solution such as is referred to as an 85 percent phosphoric acid. Other forms of phosphoric acid such as superphosphoric acid, diphosphoric acid and triphosphoric acid can be employed herein. Also, the polymeric or partial anhydrides of phosphoric acids can be employed. Typically, aqueous phosphoric acids that are of about 70 to 90 percent and preferably about 85 percent phosphoric acid are employed.

In addition to the phosphoric acid, phosphonic acids or phosphinic acids are also reacted with the epoxy-containing material. Examples of phosphonic acids are organophosphonic acids of the structure:

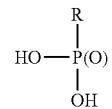

wherein R is organic radical such as those having a total of 1-30, such as 6-18 carbons. R can be aliphatic, aromatic or mixed aliphatic/aromatic and can be an unsubstituted hydrocarbon or a substituted hydrocarbon.

Examples of phosphinic acids are organophosphinic acids of the structure:

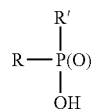

wherein preferably, R and R' are each independently hydrogen or organic radicals. Examples of such radicals are those having a total of 1-30, such as 6-18 carbons. The organic component of the phosphinic acid (R, R') can be aliphatic, aromatic or mixed aliphatic/aromatic. R and R' can be an unsubstituted hydrocarbon or a substituted hydrocarbon.

Representative of the organophosphonic acids are as follows: 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid.

The reaction of the polyepoxide with the phosphorus acids is typically conducted in organic solvent by mixing the polyepoxide with a mixture of phosphorus acid and the organophosphonic acid and/or the organophosphinic acid and heating optionally in the presence of catalyst such as an onium salt at elevated temperature for 30 to 90 minutes to complete the reaction. The relative amounts of the polyepoxide and the phosphorus acids that are reacted with one another are as follows: for each equivalent of epoxy, there are 0.1 to 0.8 moles of phosphoric acid and from 0.01 to 0.4 moles of organophosphonic and/or organophosphinic acid with the molar ratio of phosphoric to organophosphonic and/or organophosphinic acid being within the range of 1:0.01 to 0.5. The epoxy-phosphorus acid reaction products typically have an acid value of 10 to 60, preferably 15 to 50 based on resin solids.

Besides reacting the epoxy-containing material with a mixture of phosphoric acid and the organophosphonic and/or organophosphinic acid, the polyepoxide can be reacted separately with the phosphoric acid and with either or both of the organophosphonic acid and the organophosphinic acid. The various reaction products can then be combined.

The phosphated epoxy resin is typically used with a curing agent such as an aminoplast or a phenolplast resin. The useful aminoplast resins of this invention are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are preferred herein.

Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

The relative amounts of the (a) phosphated epoxy resin and (b) curing agent is from 50 to 90, preferably 60 to 75 percent by weight phosphated epoxy resin, and from 10 to 50, preferably 25 to 40 percent by weight curing agent based on solids weight of (a) and (b).

In preparing the low temperature curable composition of the invention, the above ingredients can be admixed in water in any convenient manner. Typical coating additives such as pigments, fillers, corrosion inhibitors, anti-oxidants, flow control agents, surfactants and the like can be employed herein. Preferred corrosion inhibitors are azoles, that is, 5-membered N-heterocyclic compounds that contain in the heterocyclic ring two double bonds, one or more carbon atoms and optionally a sulfur atom. The preferred azole is benzotriazole. Examples of other azoles are 5-methyl benzotriazole and 2-amino thiazole. Typically, the azole is present in the aqueous dispersion in amounts as low as 0.001 percent such as 0.001 to 1% by weight based on total weight of the aqueous dispersion.

In adapting the resinous composition to be a water-based and electrophoretic composition, it is neutralized with a base. The bases useful herein can be organic or inorganic. Illustrative examples of the bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. The percent of neutralization is such as would make the resinous blends water-dispersible and electrophoretic. Typically, the resinous blend is at least partially neutralized from about 40 to 150 percent and preferably 60 to 120 percent neutralization.

The electrodepositable compositions of this invention typically have a solids content of 5 to 25 percent and preferably 5 to 15 percent. In general, the electrodeposition bath has an operating bath conductivity within 200 to 3000 micromhos per centimeter and preferably within the range of 500 to 1500 micromhos per centimeter. The residence time of the aluminum substrate being coated in the bath is, in general, from about 90 to 120 seconds. The aluminum substrates can optionally be pretreated with a corrosion-inhibiting treatment as long as the substrate maintains its electrical conductivity.

After electrocoating, the substrate is removed and then baked in an oven at a temperature and over a period sufficient to effect cure at a low temperature. Generally, the coated substrate is baked at temperatures of about 225° F. or lower and more preferably 200° F. or lower for about 20-60 minutes. Typically the substrates can be cured at 180° F. for 20 minutes to produce hard, solvent resistant and non-tacky films. If desired, the electrocoated substrates can be baked at higher temperatures of, say, 350° F.

These and other aspects of the claimed invention are further illustrated by the following non-limiting examples.

EXAMPLES

Example I

A mixture of 824.2 parts of bisphenol A diglycidyl ether (EEW 188), 265.1 parts of bisphenol A, 210.7 parts of 2-n-butoxy-1-ethanol was heated to 115° C. At that point, 0.8 parts of ethyl triphenylphosphonium iodide was added. This mixture was heated and held at a temperature of at least 165° C. for one hour. As the mixture was allowed to cool to 88° C., 51.6 parts of Ektasolve EEH solvent (available from Eastman Chemical Company) and 23.4 parts of 2-n-butoxy-1-ethanol were added. At 88° C., 39.2 parts of 85% o-phosphoric acid and 6.9 parts of Ektasolve EEH were added, and the reaction mixture was subsequently maintained at a temperature of at least 120° C. for 30 min. At that point, the mixture was cooled to 100° C. and 72.0 parts of deionized water was gradually added. Once the water was added, a temperature of about 100° C. was maintained for 2 hours. Then the mixture was cooled to 90° C. and 90.6 parts of diisopropanolamine was added, followed by 415.5 parts of Cymel 1130 methylated/butylated melamine formaldehyde resin (available from Cytec Industries, Inc.). After 30 minutes of mixing, 1800.0 parts of this mixture was reverse-thinned into 1497.8 parts of agitated deionized water. An additional 347.1 parts of deionized water was added to yield a homogeneous dispersion which evidenced a solids content of 39.2% after 1 hour at 110° C.

Example II

A mixture of 819.2 parts of bisphenol A diglycidyl ether (EEW 188), 263.5 parts of bisphenol A, and 209.4 parts of 2-n-butoxy-1-ethanol was heated to 115° C. At that point, 0.8 parts of ethyl triphenylphosphonium iodide was added. This mixture was heated and held at a temperature of at least 165° C. for one hour. As the mixture was allowed to cool to 88° C., 51.3 parts of Ektasolve EEH solvent and 23.2 parts of 2-n- butoxy-1-ethanol were added. At 88° C., a slurry consisting of 32.1 parts of 85% o-phosphoric acid, 18.9 parts phenylphosphonic acid, and 6.9 parts of Ektasolve EEH was added. The reaction mixture was subsequently maintained at a temperature of at least 120° C. for 30 minutes. At that point, the mixture was cooled to 100° C. and 71.5 parts of deionized water was gradually added. Once the water was added, a temperature of about 100° C. was maintained for 2 hours. Then the reaction mixture was cooled to 90° C. and 90.0 parts of diisopropanolamine was added, followed by 413.0 parts of Cymel 1130 and 3.0 parts of deionized water. After 30 minutes of mixing, 1800.0 parts of this mixture was reverse-thinned into 1506.0 parts of agitated deionized water. An additional 348.0 parts of deionized water was added to yield a homogeneous dispersion which evidenced a solids content of 39.5% after 1 hour at 110° C.

Resinous blends of the above-described phosphated epoxy resins were prepared as follows:

| Ingredients | Parts by Weight |
| --- | --- |
| Phosphated epoxy resin dispersion | 1432 |
| Pigment paste[1] | 318 |
| Deionized water | 2050 |

[1]Grey pigment paste, ACPP-1120, available from PPG Industries, Inc., 51.4% solids.

The above ingredients were thoroughly blended to produce a resinous blend having a solids content of 19% with a pigment/binder ratio of 0.2. An electrodeposition bath containing this blend with Example I and another one containing this blend with Example II were prepared and separately used to coat both clean/deoxidized aluminum panels as well as aluminum panels which had first been treated with Alodine 1200 (available from Henkel Corporation) both before and after 50% ultrafiltration of the respective baths. The coatouts were all performed at 250 to 300 volts for 90 seconds at bath temperatures of 24-279° C. The panels were all baked at 93° C. (200° F.) for 30 min. in a gas-fired oven and examined afterwards under a Nikon optiphot microscope with a 10× eyepiece and 10× objective. The panels coated with the resinous blend containing the phosphated epoxy resin of Example II were seen to be distinctly smoother and evidenced significantly fewer pinhole-like defects than those panels which were coated with the resinous blend containing the phosphated epoxy resin of Example I.

Whereas particular embodiments of this invention have been described above for purposes of illustration, it will be evident to those skilled in the art that numerous variations of the details of the present invention may be made without departing from the invention as defined in the appended claims.

What is claimed is:

1. A process for providing a coating on an aluminum substrate by passing electric current between the substrate acting as an anode and a cathode in electrical contact with an electrodeposition bath containing an aqueous dispersion of a base-neutralized resinous composition comprising a curing agent and an ungelled phosphated epoxy resin in which the phosphated epoxy resin comprises a mixture of the reaction product of one or more polymeric epoxy compounds with phosphoric acid and with an organophosphonic acid and/or an organophosphinic acid, wherein the phosphated epoxy resin contains from 0.1 to 0.8 moles of phosphoric acid to one equivalent of epoxy and from 0.01 to 0.4 moles of phosphonic and/or an organophosphinic acid per equivalent of epoxy; in which the phosphated epoxy resin is resent in an amount of 50 to 90 percent by weight and the curing agent is present in an amount of 10 to 50 percent by weight, the percentages being based on the total solids weight of the phosphated epoxy resin and the curing agent.

2. The process of claim 1 in which the polymeric epoxy compound is selected from a polyglycidyl ether of a polyphenol and an epoxy-functional acrylic resin.

3. The process of claim 1 in which the mixture additionally comprises a monomeric monoepoxide.

4. The process of claim 1 in which the phosphated epoxy resin has an acid number of 15 to 50 based on resin solids.

5. The process of claim 1 in which the curing agent is an aminoplast.

6. The process of claim 1 in which the organophosphonic acid is phenyl phosphonic acid.

7. The method of claim 1, wherein the molar ratio of phosphoric acid to organophosphonic and/or organophosphinic acid is within the range of 1:0.01 to 0.5.

8. The process of claim 1, wherein the base-neutralized resinous composition further comprises an azole.

9. The process of claim 8, in which the azole is benzotriazole.

10. The process of claim 8 in which the azole is present in the composition in an amount of 0.001 to 1.0 percent by weight based on total weight of the aqueous resinous dispersion.

11. An aqueous resinous dispersion comprising:
   (a) a base-neutralized resinous composition comprising a curing agent and an ungelled phosphated epoxy resin in which the phosphated epoxy resin comprises a mixture of the reaction product of one or more polymeric epoxy compounds with phosphoric acid and with an organophosphonic acid and/or an organophosphinic acid, wherein the phosphated epoxy resin contains from 0.1 to 0.8 moles of phosphoric acid and from 0.01 to 0.4 moles of phosphonic and/or an organophosphinic acid per equivalent of epoxy with the molar ratio of phosphoric acid to organophosphonic and/or organophosphinic acid being within the range of 1:0.01 to 0.5;
   in which the phosphated epoxy resin is present in an amount of 50 to 90 percent by weight and the curing agent is present in an amount of 10 to 50 percent by weight, the based on the total solids weight phosphated epoxy resin and the curing agent; and
   (b) an azole.

12. The aqueous resinous dispersion of claim 11, wherein the azole comprises a sulfur atom.

13. The aqueous resinous dispersion of claim 12, wherein the azoic comprises a thiazole.

14. A method of using the aqueous resinous dispersion of claim 11, comprising passing electric current between a substrate acting as an anode and a cathode in electrical contact with an electrodeposition bath comprising the aqueous resinous dispersion.

15. The method of claim 14, wherein the substrate comprises aluminum.

16. The method of claim 15, wherein the azole comprises a sulfur atom.

17. The method of claim 16, wherein the azole comprises a thiazole.

18. The aqueous dispersion of claim 11 in which the azole is present in the composition in an amount of 0.001 to 1.0 percent by weight based on total weight of the aqueous resinous dispersion.

19. An aqueous resinous dispersion comprising:
   (a) a base-neutralized resinous composition comprising a curing agent and an ungelled phosphated epoxy resin in which the phosphated epoxy resin comprises a mixture of the reaction product of one or more polymeric epoxy compounds with phosphoric acid and with an organophosphonic acid and/or an organophosphinic acid;

in which the phosphated epoxy resin is present in an amount of 50 to 90 percent by weight and the curing agent is present in an amount of 10 to 50 percent by weight, the percentages being based on the total solids weight of the phosphated epoxy resin and the curing agent; and (b) an azole.

20. The aqueous resinous dispersion of claim 19, wherein the azole comprises a thiazole.

21. The aqueous dispersion of claim 19 in which the azole is present in the composition in an amount of 0.001 to 1.0 percent by weight based on total weight of the aqueous resinous dispersion.

* * * * *